US012645739B1

(12) United States Patent

Ji et al.

(10) Patent No.: US 12,645,739 B1

(45) Date of Patent: Jun. 2, 2026

(54) METHOD FOR QUERYING HIGH-CONNECTIVITY SHORTEST INFLUENCE PATH BETWEEN USERS, DEVICE, AND PRODUCT

(71) Applicant: Hangzhou Dianzi University, Hangzhou City (CN)

(72) Inventors: Yuxuan Ji, Hangzhou City (CN); Jian Xu, Hangzhou City (CN); Wanning Wan, Hangzhou City (CN)

(73) Assignee: Hangzhou Dianzi University, Hangzhou City (CN)

( * ) Notice: Subject to any disclaimer, the term of this patent is extended or adjusted under 35 U.S.C. 154(b) by 0 days.

(21) Appl. No.: 19/022,055

(22) Filed: Jan. 15, 2025

(30) Foreign Application Priority Data

Dec. 4, 2024 (CN) .......................... 202411766225.8

(51) Int. Cl.
  *G06F 16/901* (2019.01)
  *G06F 16/9536* (2019.01)
  (Continued)

(52) U.S. Cl.
  CPC ...... *G06F 16/9024* (2019.01); *G06F 16/9536* (2019.01); *G06Q 30/02011* (2025.08); *G06Q 30/02022* (2025.08); *G06Q 10/40* (2026.01)

(58) Field of Classification Search
  CPC ......................................... G06Q 10/00–50/00
  (Continued)

(56) References Cited

U.S. PATENT DOCUMENTS

| | | | |
|---|---|---|---|
| 8,443,005 B1 * | 5/2013 | Goldman | ............ G06F 16/9536 |
| | | | 707/798 |
| 8,736,612 B1 * | 5/2014 | Goldman | ............ G06F 16/9536 |
| | | | 345/440 |

(Continued)

FOREIGN PATENT DOCUMENTS

| | | | | |
|---|---|---|---|---|
| WO | WO-2010048172 A1 * | 4/2010 | ............ | G06F 16/35 |

OTHER PUBLICATIONS

Cao, Lili, et al. "Atlas: Approximating shortest paths in social graphs." Computer Science Department (2011). (Year: 2011).*

(Continued)

*Primary Examiner* — Alan S Miller

(74) *Attorney, Agent, or Firm* — Thomas Horstemeyer, LLP

(57) ABSTRACT

The present application provides a method for querying a high-connectivity shortest influence path between users, a device, and a product. The method includes: constructing an indexed linked list data structure based on an obtained social network graph; determining, based on the indexed linked list data structure, a start node, a target node, and a path connectivity in a current iteration, whether there is a shortest influence path satisfying the path connectivity in the current iteration; if yes, updating a minimum path connectivity in a previous iteration and determining the path connectivity in the current iteration based on the minimum path connectivity; or if no, determining the path connectivity in the current iteration as a maximum path connectivity in the previous iteration; and continuing the iteration based on the maximum path connectivity and the minimum path connectivity until a high-connectivity shortest influence path is determined.

10 Claims, 8 Drawing Sheets

(51) Int. Cl.

| | | |
|---|---|---|
| *G06Q 10/40* | (2026.01) | |
| *G06Q 30/0201* | (2023.01) | |
| *G06Q 30/0202* | (2023.01) | |

(58) Field of Classification Search
USPC ............................................... 705/7.11–7.42
See application file for complete search history.

(56) References Cited

U.S. PATENT DOCUMENTS

| | | | | |
|---|---|---|---|---|
| 8,739,016 | B1 * | 5/2014 | Goldman ............ | G06F 16/9536 715/200 |
| 8,773,437 | B1 * | 7/2014 | Goldman ............ | G06F 16/9536 345/440 |
| 8,893,008 | B1 * | 11/2014 | Goldman ............ | G06F 16/9536 715/753 |
| 9,189,567 | B1 * | 11/2015 | Goldman ............ | G06F 16/9536 |
| 9,342,624 | B1 * | 5/2016 | Ojha .................. | G06F 16/24578 |
| 9,563,923 | B2 * | 2/2017 | Sachdev ................ | G06Q 10/40 |
| 9,721,296 | B1 * | 8/2017 | Chrapko ............ | G06Q 10/0635 |
| 9,959,350 | B1 * | 5/2018 | Goldman ............ | G06F 16/9536 |
| 11,386,129 | B2 * | 7/2022 | Chrapko ................ | G06F 16/29 |
| 12,339,876 | B2 * | 6/2025 | Chrapko ................ | G06F 16/29 |
| 2010/0049770 | A1 * | 2/2010 | Ismalon ............. | G06F 16/3325 707/765 |
| 2011/0295626 | A1 * | 12/2011 | Chen ...................... | G06Q 30/02 706/54 |
| 2013/0007126 | A1 * | 1/2013 | Ziemann ................ | G06Q 10/40 709/204 |
| 2014/0188994 | A1 * | 7/2014 | Patterson .............. | H04L 67/306 709/204 |
| 2014/0214941 | A1 * | 7/2014 | Shapero ................ | H04L 51/226 709/204 |
| 2014/0274246 | A1 * | 9/2014 | Tsai .......................... | G06N 5/00 463/9 |
| 2015/0026120 | A1 * | 1/2015 | Chrapko ............... | G06F 16/904 707/748 |
| 2016/0162600 | A1 * | 6/2016 | Tong .................. | G06Q 10/0639 707/746 |
| 2016/0371795 | A1 * | 12/2016 | Chrapko ................ | G06Q 10/40 |
| 2017/0286975 | A1 * | 10/2017 | Pal ...................... | G06Q 30/0201 |
| 2017/0293873 | A1 * | 10/2017 | Chrapko ............ | G06Q 10/0635 |
| 2023/0394722 | A1 * | 12/2023 | Shrivastava ............ | G06T 11/26 |

OTHER PUBLICATIONS https://en.wikipedia.org/wiki/Longest_path_problem (Year: 2025).*
https://en.wikipedia.org/wiki/Shortest_path_problem (Year: 2025).*
Afrasiabi Rad, Amir. Social network analysis and time varying graphs. Diss. UniversitÃ© d'Ottawa/University of Ottawa, 2016. (Year: 2016).*
Eremeev, Andrei. "The spanning tree based approach for solving the shortest path problem in social graphs." (2016). (Year: 2016).*
First Office Action issued by the State Intellectual Property Office of People's Republic of China, issued Jul. 1, 2025 in corresponding application No. CN202411766225.8.

* cited by examiner

| U1' | D(u2), P(u2), CN_P(u2) | D(u3), P(u3), CN_P(u3) | D(u4), P(u4), CN_P(u4) | D(u5), P(u5), CN_P(u5) | D(u6), P(u6), CN_P(u6) | D(u7), P(u7), CN_P(u7) | D(u8), P(u8), CN_P(u8) |
|---|---|---|---|---|---|---|---|
| u1 | 1,u1,1 | 1,u1,2 | 1,u1,1 | ∞ | ∞ | ∞ | ∞ |
| u1,u2 | | 1,u1,2 | 1,u1,1 | 2,u2,2 | 2,u2,1 | ∞ | ∞ |
| u1,u2,u3 | | | 1,u1,1 | 2,u2,2 | 2,u2,1 | ∞ | 2,u3,1 |
| u1,u2,u3,u4 | | | | 2,u2,2 | 2,u2,1 | ∞ | 2,u3,1 |
| u1,u2,u3,u4, u5 | | | | | 2,u2,1 | 3,u5,1 | 2,u3,1 |
| u1,u2,u3,u4, u5,u6 | | | | | | 3,u5,1 | 2,u3,1 |
| u1,u2,u3,u4, u5,u6,u8 | | | | | | 3,u5,1 | |
| u1,u2,u3,u4, u5,u6,u8,u7 | | | | | | | |

FIG. 5

| ShortestPath | minPathCN | maxPathCN | PathCN |
|---|---|---|---|
| u1->u3->u8 | 1 | | |
| u1->u3->u5->u8 | 2 | 4 | 3 |
| u1->u3->u5->u8 | 2 | 3 | |

FIG. 6

METHOD FOR QUERYING HIGH-CONNECTIVITY SHORTEST INFLUENCE PATH BETWEEN USERS, DEVICE, AND PRODUCT

CROSS REFERENCE TO RELATED APPLICATION

This patent application claims the benefit and priority of Chinese Patent Application No. 2024117662258, filed with the China National Intellectual Property Administration on Dec. 4, 2024, the disclosure of which is incorporated by reference herein in its entirety as part of the present application.

TECHNICAL FIELD

The present application relates to the field of computer technologies, and in particular, to a method for querying a high-connectivity shortest influence path between users, a device, and a product.

BACKGROUND

Development of an Internet technology leads to explosive growth of users in a social network. Research on mutual influence between users in an information propagation process has become a focus in the field of data analysis. In this problem, during link prediction, a possibility of a link between two nodes that have not been connected by an edge in the network is predicted based on known information such as nodes in the network and a structure of the network.

At present, a main challenge faced by enterprises and government departments in product promotion or policy propaganda through the Internet technology is how to properly select nodes or paths in the information propagation process. Therefore, how to implement proper node selection in the information propagation process to accelerate propagation and expand influence coverage is an urgent problem to be resolved.

SUMMARY

An objective of the present application is to provide a method for querying a high-connectivity shortest influence path between users, a device, and a product. Nodes can be properly selected in an information propagation process, to accelerate propagation and expand coverage.

To achieve the foregoing objective, the present application provides the following solutions:

According to a first aspect, the present application provides a method for querying a high-connectivity shortest influence path between users, including:

constructing an indexed linked list data structure based on an obtained social network graph, where the social network graph includes a plurality of nodes and edges connecting adjacent ones of the nodes, the nodes represent users in a social network, the edges represent mutual influence between adjacent ones of the users, and two nodes connected by each edge are neighboring nodes; the indexed linked list data structure is a linked list array data structure corresponding to each object node, and the linked list array data structure includes the object node, one or more single-hop connectivities corresponding to the object node, and a neighboring node linked list corresponding to each single-hop connectivity; and the single-hop connectivity is a quantity of common neighboring nodes of adjacent nodes;

determining, based on a given path connectivity, the indexed linked list data structure, a start node, and a target node, whether there is a shortest influence path satisfying the given path connectivity; and determining a search range of the path connectivity, that is, initializing a minimum path connectivity and a maximum path connectivity, which specifically includes:

determining a path connectivity in a current iteration based on a minimum path connectivity in a previous iteration, and determining, based on a given path connectivity, the indexed linked list data structure, a start node, and a target node, whether there is a shortest influence path satisfying the given path connectivity, where the given path connectivity is the path connectivity in the current iteration; and if the current iteration is the first iteration, the minimum path connectivity in the previous iteration is set to 1;

if there is a shortest influence path satisfying the given path connectivity, calculating a shortest influence path in the current iteration and a path connectivity corresponding to the shortest influence path in the current iteration, updating the minimum path connectivity in the previous iteration to the path connectivity corresponding to the shortest influence path in the current iteration, namely an actual path connectivity, and returning to the step of "determining a path connectivity in a current iteration based on a minimum path connectivity in a previous iteration, and determining, based on a given path connectivity, the indexed linked list data structure, a start node, and a target node, whether there is a shortest influence path satisfying the given path connectivity"; or if there is no shortest influence path satisfying the given path connectivity, updating a maximum path connectivity in the previous iteration to the path connectivity in the current iteration to obtain a search range of the path connectivity; and continuing the iteration based on the minimum path connectivity and the maximum path connectivity in the previous iteration until a high-connectivity shortest influence path is determined, where the high-connectivity shortest influence path is used to propagate information.

Optionally, the continuing the iteration based on the minimum path connectivity and the maximum path connectivity in the previous iteration until a high-connectivity shortest influence path is determined, that is, searching for the high-connectivity shortest influence path within the range defined by the minimum path connectivity and the maximum path connectivity, specifically includes:

determining an intermediate path connectivity in the current iteration based on the minimum path connectivity and the maximum path connectivity in the previous iteration, updating the path connectivity in the current iteration to the intermediate path connectivity in the current iteration, and determining, based on the given path connectivity, the indexed linked list data structure, the start node, and the target node, whether there is a shortest influence path satisfying the given path connectivity, to obtain a first determining result;

if the first determining result is yes, calculating the shortest influence path in the current iteration and the path connectivity corresponding to the shortest influence path in the current iteration, and updating the minimum path connectivity in the previous iteration to the path connectivity corresponding to the shortest influence path in the current iteration; and determining whether a difference between the minimum path connectivity and the maximum path connectivity in the previous iteration is 1, to obtain a second determining result;

if the second determining result is yes, stopping the iteration, and determining the shortest influence path in the current iteration as the high-connectivity shortest influence path; or if the second determining result is no, returning to the step of "determining an intermediate path connectivity in the current iteration based on the minimum path connectivity and the maximum path connectivity in the previous iteration, updating the path connectivity in the current iteration to the intermediate path connectivity in the current iteration, and determining, based on the given path connectivity, the indexed linked list data structure, the start node, and the target node, whether there is a shortest influence path satisfying the given path connectivity, to obtain a first determining result";

if the first determining result is no, updating the maximum path connectivity in the previous iteration to the path connectivity in the current iteration, and determining whether the difference between the minimum path connectivity and the maximum path connectivity in the previous iteration is 1, to obtain a third determining result; and if the third determining result is yes, stopping the iteration, and determining a shortest influence path in the previous iteration as the high-connectivity shortest influence path; or if the third determining result is no, returning to the step of "determining an intermediate path connectivity in the current iteration based on the minimum path connectivity and the maximum path connectivity in the previous iteration, updating the path connectivity in the current iteration to the intermediate path connectivity in the current iteration, and determining, based on the given path connectivity, the indexed linked list data structure, the start node, and the target node, whether there is a shortest influence path satisfying the given path connectivity".

According to a second aspect, the present application provides a computer device, including a memory, a processor, and a computer program stored in the memory and executable on the processor. The processor executes the computer program to implement the foregoing method for querying a high-connectivity shortest influence path between users.

According to a third aspect, the present application provides a computer program product, including a computer program. The computer program, when executed by a processor, implements the foregoing method for querying a high-connectivity shortest influence path between users.

According to specific embodiments provided in the present application, the present application discloses the following technical effects:

The present application provides the method for querying a high-connectivity shortest influence path between users, a device, and a product. In the present application, the indexed linked list data structure is constructed. Node information in the social network graph and the single-hop connectivities corresponding to the node are combined. The single-hop connectivity is measured through a quantity of common neighbors (CNs) of adjacent nodes in the social network graph. In this way, an influence propagation path between users is analyzed. A node easy to be influenced can be queried such that the formed propagation path can have a better propagation effect. In addition, in the present application, an estimated shortest influence path is continuously optimized by adjusting the maximum path connectivity and the minimum path connectivity through a plurality of iterations, to quickly obtain a calculation result.

BRIEF DESCRIPTION OF THE DRAWINGS

To describe the technical solutions in the embodiments of the present application or in the prior art more clearly, the following briefly describes the accompanying drawings required for the embodiments. Apparently, the accompanying drawings in the following description show merely some embodiments of the present application, and a person of ordinary skill in the art may still derive other accompanying drawings from these accompanying drawings without creative efforts.

FIG. 5 is a schematic diagram of a process of updating an initial set and state variables according to another embodiment of the present application;

FIG. 6 is a schematic diagram of a process of searching for a maximum path connectivity and a minimum path connectivity according to another embodiment of the present application.

DETAILED DESCRIPTION OF THE EMBODIMENTS

The technical solutions in the embodiments of the present application are clearly and completely described below with reference to the accompanying drawings in the embodiments of the present application. Apparently, the described embodiments are merely some rather than all of the embodiments of the present application. All other embodiments obtained by a person of ordinary skill in the art based on the embodiments of the present application without creative efforts shall fall within the protection scope of the present application.

Existing social network analysis techniques usually use a social network graph to depict an influence relationship between users. Nodes are used to represent the users. Edges directly connecting the nodes represent a propagation path of influence between users. However, in real life, influence propagation between people is not limited to direct propagation between two people, but may often be propagation in other ways of mutual connection, for example, through common friends. In other words, a conventional method for querying an influence propagation path often focuses only on a possibility of "direct propagation" and ignores influence indirectly propagated by other users. Therefore, the present application provides a method for querying a high-connectivity shortest influence path between users, a device, and a product, which can resolve a defect that link prediction is not accurate enough in the existing social network analy- sis techniques, to accelerate propagation and expand influ- ence coverage through proper node selection in an informa- tion propagation process.

To make the foregoing objective, features, and advantages of the present application clearer and more comprehensible, the present application will be further described in detail below with reference to the accompanying drawings and specific embodiments.

Figure 1:
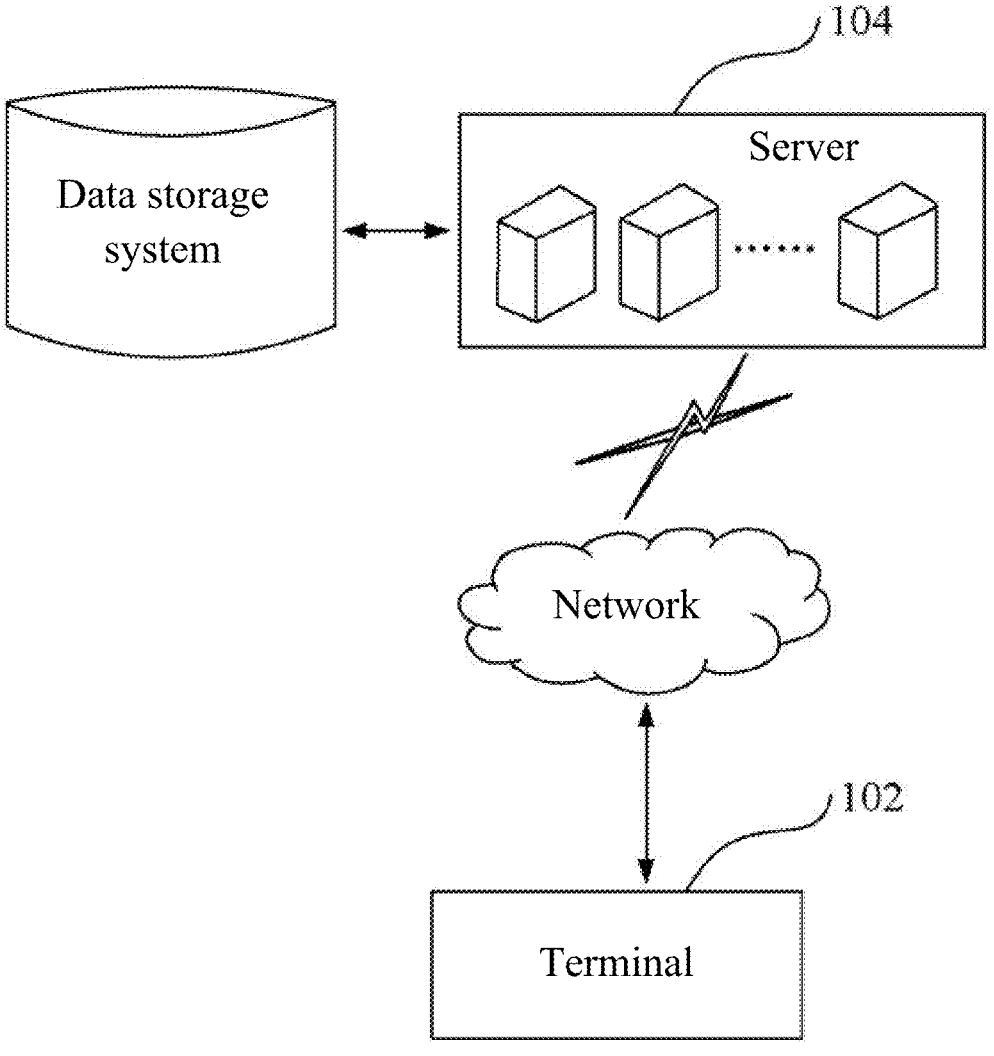
FIG. 1 is a diagram of an application environment of a method for querying a high-connectivity shortest influence path between users according to an embodiment of the present application.

The method for querying a high-connectivity shortest influence path between users provided in the embodiments of the present application may be applied to an application environment shown in FIG. 1. A terminal 102 communicates with a server 104 over a network. A data storage system may store data that the server 104 needs to process. The data storage system may be disposed separately, integrated on the server 104, or disposed on the cloud or another server. The terminal 102 may send an input social network graph, start node, and target node to the server 104. After the server 104 receives the social network graph, start node, and target node, the server 104 constructs an indexed linked list data structure based on the obtained social network graph, and gradually updates and iterates a minimum path connectivity and a maximum path connectivity based on the indexed linked list data structure, the start node, the target node, and a path connectivity in a current iteration until a high-connectivity shortest influence path is determined. The server 104 may feed back the obtained high-connectivity shortest influence path to the terminal 102. In addition, in some embodiments, the method for querying an influence propagation path between users may alternatively be inde- pendently implemented by the server 104 or the terminal 102. For example, the terminal 102 may directly process the input social network graph, start node, and target node; or the server 104 may obtain a to-be-processed social network graph, start node, and target node from the data storage system and process them.

The terminal 102 may be, but is not limited to, various desktop computers, notebook computers, and Internet of Things devices. The server 104 may be implemented by an independent server or a server cluster composed of a plu- rality of servers, or may be a cloud server.

Figure 2:
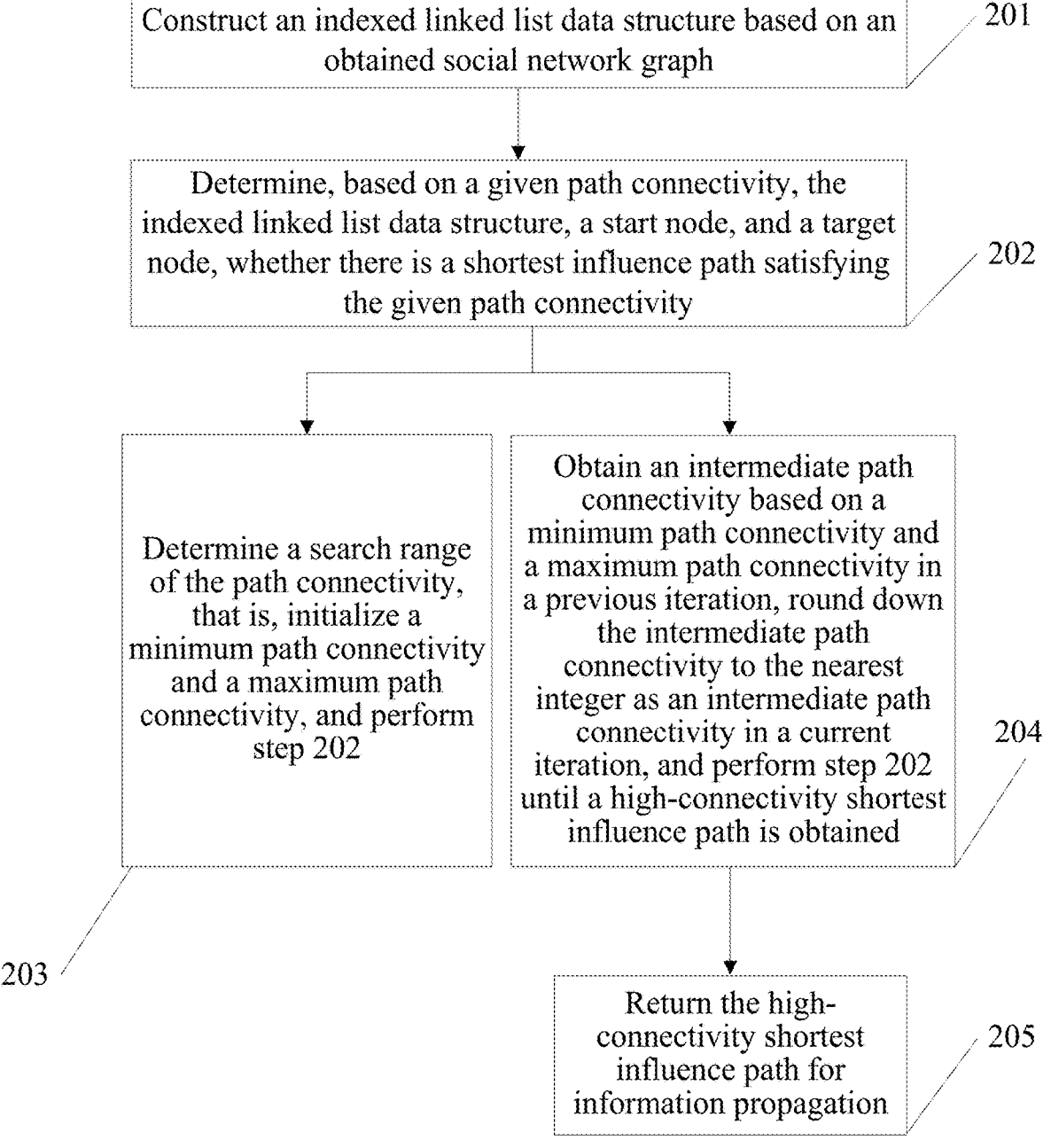
FIG. 2 is a schematic flowchart of a method for querying a high-connectivity shortest influence path between users according to an embodiment of the present application.

In an exemplary embodiment, as shown in FIG. 2, a method for querying a high-connectivity shortest influence path between users is provided. The method is performed by a computer device. Specifically, the method may be inde- pendently performed by a computer device such as a termi- nal or a server, or may be performed by a terminal and a server together. In the embodiments of the present applica- tion, an example in which the method is applied to the server 104 in FIG. 1 is used for description. The method includes steps 201 to 205.

Step 201: Construct an indexed linked list data structure based on an obtained social network graph. The social network graph includes a plurality of nodes and edges connecting adjacent ones of the nodes. The nodes represent users in a social network. The edges represent mutual influence between adjacent ones of the users. Two nodes connected by each edge are neighboring nodes. The indexed linked list data structure is a linked list array data structure corresponding to each object node. The linked list array data structure includes the object node, one or more single-hop connectivities corresponding to the object node, and a neighboring node linked list corresponding to each single-hop connectivity. The single-hop connectivity is a quantity of common neighboring nodes of adjacent nodes. After the indexed linked list data structure is constructed, a single-hop connectivity between a query node and its neighboring node in the indexed linked list data structure can be reused in subsequent queries, to improve query efficiency. The fol- lowing content is specifically included.

Step 2011: Input a social network graph G=(U, E). A node set U={u1, u2, u3, . . . , ui, . . . , um} represents a set of users in a social network. The node ui represents a user i. E={e1, e2, e3, . . . , en} represents edges connecting adjacent nodes (namely mutual influence between adjacent users). Two nodes connected by each edge are neighboring nodes, indi- cating that two users are friends.

Step 2012: Define and initialize variables. A single-hop connectivity (namely a CN value) indicates a quantity of common neighboring nodes of adjacent nodes, namely a quantity of CNs of a user and another user. Therefore, one user may have a plurality of CN values. For example, assuming that a neighboring node set of the node u1 is N(u1)={u2, u3, u4}, and a neighboring node set of the node u3 is N(u3)={u1, u2, u4, u5, u8}, the nodes u1 and u3 are neighboring nodes and have two common neighboring nodes u2 and u4. In this case, the single-hop connectivity between the nodes u1 and u3 is 2.

In addition, if CN=j, a j-CN reachable node represents a corresponding neighboring node when a single-hop connec- tivity of a node is j, namely a user that has j neighbors in common with a user represented by the node. A user and another user are mutually j-CN reachable when they have more than j CNs.

Step 2013: Calculate a quantity of CNs of the node and its neighboring node.

Step 2013a: Assuming that a node uk is a neighboring node of the node ui, calculate an intersection $N'=N(ui) \cap N$ (uk) of a neighboring node set N(ui) of the node ui and a neighboring node set N (uk) of the node uk, and calculate a quantity of nodes in the obtained intersection, namely a quantity of common neighboring nodes of the nodes ui and uk. An array sumui[uk]=n is used to represent the quantity of common neighboring nodes of the node ui and its neighboring node uk. n is the quantity of common neigh- boring nodes of the nodes uk and ui. The node uk is an n-CN reachable node of the node ui. For example, the nodes u1 and u3 have two same neighboring nodes, and the node u3 is a 2—CN reachable node of the node u1 as defined above.

Step 2013b: Repeat step 2013a for all neighboring nodes of the node ui.

Step 2014: Generate an indexed linked list data structure for different CN values of the node and the neighboring node (namely a reachable node) corresponding to each CN value.

Step 2014a: Establish and initialize a linked list array CNui [maxCN+1]. A subscript of the array represents the CN value of the node ui. The array stores a head node pointer of a reachable node linked list corresponding to the CN value represented by the subscript. Because the CN value of each neighboring node of the node ui has been obtained in step 2013, a length of the array is a maximum CN value maxCN plus 1. When the subscript is equal to 0, there is no need to store a reachable node linked list in the subscript such that a position at which the subscript is 0 is left empty.

Step 2014b: Establish a plurality of reachable node linked lists based on the length of the array, and sequentially add the node uk to linked lists cnLink corresponding to the CN values based on the array sumui[uk] obtained in step 2013.

(1) With cnLink representing the reachable node linked list, initialize the reachable node linked list cnLink corresponding to CN=sumui[uk]=n, and initialize its head node pointer headNode. (2) Sequentially add the nodes in the array sumui[uk]=n at the end of the linked list cnLink based on their n values. For example, if there are sumu1[u2]=1 and sumu1[u4]=1 with CN=1 for the node u1, the nodes u2 and u4 are sequentially added to the following linked list cnLink corresponding to CN=1 for the node u1: u2→u4, and a head node pointer headNode pointing to the node u2 is stored. (3) Store the head node pointer headNode pointing to the linked list cnLink corresponding to the CN value at a corresponding position of a linked list array CNui[n]. For example, if there is the following linked list cnLink corresponding to CN=1 for the node u1: u2→u4, CNu1[1] stores a head node pointer of cnLink as follows: CNu1[1]=headNode→u2.

Step 2014c: Repeat steps 2014a and 2014b until the linked list cnLink is established and storage in the linked list array CNui[n] is completed for each CN value of the node ui, to form the indexed linked list data structure of the node ui.

Step 2015: Repeat steps 2012 to 2014 until the indexed linked list data structure of each node in the node set U is constructed.

Step 202: Determine, based on a given path connectivity, the indexed linked list data structure, a start node, and a target node, whether there is a shortest influence path satisfying the given path connectivity. The given path connectivity is constantly changing based on an input path connectivity in a current iteration. The following content is specifically included.

Step 2021: Create an initial set and state variables. The initial set includes only the start node in an initial phase. It is a subset of the set U containing all nodes. If a shortest path from the start node to a node v' is known, the node V is included in the initial set. The state variables include a first state variable D(w), a second state variable P(w), and a third state variable CN_P(w).

The first state variable D(w) represents a length of a shortest path from the start node to a node w passing through the node v' in a current phase. The node V is a node newly added to the initial set in the current phase. The node w is a neighboring node of the node V and is not added to the initial set in the current phase. In the initial phase, because there is only the start node in the initial set, D(w)=1 is set only for a neighboring node of the start node, which means that a length of a path to the neighboring node is 1, and an initial value of ∞ is assigned to the other nodes, which means that they are currently unreachable. The second state variable P(w) represents a predecessor node, which may be the node V. The third state variable CN_P(w) represents a single-hop connectivity between the node w and the second state variable P(w).

Step 2022: Add the node v' with a minimum value of the first state variable D(w) in the current phase to the initial set to obtain an updated initial set.

Step 2023: Traverse an indexed linked list data structure of the node v', and determine whether a maximum single-hop connectivity of the node V is greater than or equal to the given path connectivity.

Step 2023a: If the maximum single-hop connectivity of the node V is greater than or equal to the given path connectivity, obtain a neighboring node of the node v' and with a maximum single-hop connectivity greater than or equal to the given path connectivity, and update the state variables.

The first state variable D(w) is updated based on the following formula:

$$D(w)=\min(D(w),D(v')+1)$$

D(v') represents a length of a shortest path in a previous phase. If the first state variable D(w) changes, the second state variable P(w) is set to the node v', and the third state variable CN_P(w) is set to a single-hop connectivity between the node v' and the node w. If the first state variable D(w) does not change, the second state variable P(w) and the third state variable CN_P(w) remain unchanged.

Return to the step "Add the node v' with a minimum value of the first state variable D(w) in the current phase to the initial set", until all nodes in the social network are in the initial set or the first state variable D(w) of any node that is not in the initial set is ∞.

Determine whether the first state variable D(w) of the target node is ∞. If the first state variable D(w) of the target node is ∞, determine that there is no shortest influence path corresponding to the given path connectivity. If the first state variable D(w) of the target node is not ∞, determine that there is a shortest influence path corresponding to the given path connectivity. In this way, a minimum single-hop connectivity between all adjacent nodes on the short influence path can be obtained through traversing and used as an actual connectivity of the shortest influence path.

Step 2023b: If the single-hop connectivity of the node V is less than the given path connectivity, determine that there is no shortest influence path corresponding to the given path connectivity.

Step 203: Determine a search range of the path connectivity, that is, initialize a minimum path connectivity and a maximum path connectivity. The following content is specifically included.

Step 2031: If the current iteration is the first iteration, set a minimum path connectivity in a previous iteration to 1.

Step 2032: Set the path connectivity in the current iteration to twice the minimum path connectivity in the previous iteration, and perform step 202 "Determine, based on a given path connectivity, the indexed linked list data structure, a start node, and a target node, whether there is a shortest influence path satisfying the given path connectivity".

Step 2032a: If yes, calculate a shortest influence path in the current iteration and a path connectivity corresponding to the shortest influence path in the current iteration, update the minimum path connectivity in the previous iteration to the path connectivity corresponding to the shortest influence path in the current iteration, and return to step 2032. The path connectivity corresponding to the shortest influence path in the current iteration is a minimum single-hop connectivity between all adjacent nodes on a path (namely the shortest influence path in the current iteration) connecting two nodes.

Step 2032b: If no, output the minimum path connectivity in the previous iteration, and update a maximum path connectivity in the previous iteration to the path connectivity in the current iteration, to obtain an initial minimum path connectivity and maximum path connectivity, and proceed to the next step.

Step 204: Obtain an intermediate path connectivity based on the minimum path connectivity and the maximum path connectivity in the previous iteration, round down the intermediate path connectivity to the nearest integer as an intermediate path connectivity in the current iteration of this step, and determine whether there is a shortest influence path satisfying the path connectivity. The following content is specifically included.

Determine the intermediate path connectivity in the current iteration based on the minimum path connectivity and the maximum path connectivity in the previous iteration, update the path connectivity in the current iteration to the intermediate path connectivity in the current iteration, and perform step 202 to determine whether the shortest influence path in the current iteration can be obtained, to obtain a first determining result.

If the first determining result is yes, calculate the shortest influence path in the current iteration and the path connectivity corresponding to the shortest influence path in the current iteration based on the path connectivity in the current iteration, and update the minimum path connectivity in the previous iteration to the path connectivity corresponding to the shortest influence path in the current iteration; and determine whether a difference between the minimum path connectivity and the maximum path connectivity is 1, to obtain a second determining result.

If the second determining result is yes, stop the iteration, and determine the shortest influence path in the current iteration as a high-connectivity shortest influence path. If the second determining result is no, perform the next iteration of this step.

If the first determining result is no, update the maximum path connectivity in the previous iteration to the path connectivity in the current iteration, and determine whether the difference between the minimum path connectivity and the maximum path connectivity in the previous iteration is 1, to obtain a third determining result.

If the third determining result is yes, stop the iteration, and determine a shortest influence path in the previous iteration as the high-connectivity shortest influence path. If the third determining result is no, perform the next iteration of this step.

Step 205: Return the high-connectivity shortest influence path for information propagation.

In addition, the method for querying a high-connectivity shortest influence path between users provided in this embodiment further includes: determining, based on a connectivity and length of the high-connectivity shortest influence path, a possibility of achieving influence between nodes, and propagating information along the high-connectivity shortest influence path.

By implementing steps 201 to 205, in the present application, the indexed linked list data structure is constructed. Node information in the social network graph and the single-hop connectivities corresponding to the node are combined. The single-hop connectivity is measured through a quantity of CNs of adjacent nodes in the social network graph. A possibility of influence propagation between users is described. A returned influence propagation path is more in line with a real scene. In this way, the influence propagation path between users is analyzed. A node easier to be influenced can be queried such that the formed propagation path can have a wider propagation range. In addition, in the present application, an estimated shortest influence path is continuously optimized by adjusting the maximum path connectivity and the minimum path connectivity through a plurality of iterations, to finally determine the high-connectivity shortest influence path. The possibility of achieving influence between nodes can be determined based on the path connectivity and the path length. Furthermore, the indexed linked list data structure is constructed based on the single-hop connectivity between adjacent nodes, to reduce the search range. By introducing the maximum path connectivity and the minimum path connectivity, the high-connectivity shortest influence path is quickly obtained through a dichotomy regression method, to improve search efficiency.

In another exemplary embodiment of the present application, a social network graph $G_1$ is used as an example for detailed description. It includes a node set {u1, u2, u3, u4, u5, u6, u7, u8}.

Step 1: Traverse and query a single-hop connectivity between each node and its neighboring node in the social network graph, and generate an indexed linked list data structure for an object node, one or more single-hop connectivities corresponding to the object node, and a neighboring node corresponding to each single-hop connectivity.

Figure 3:
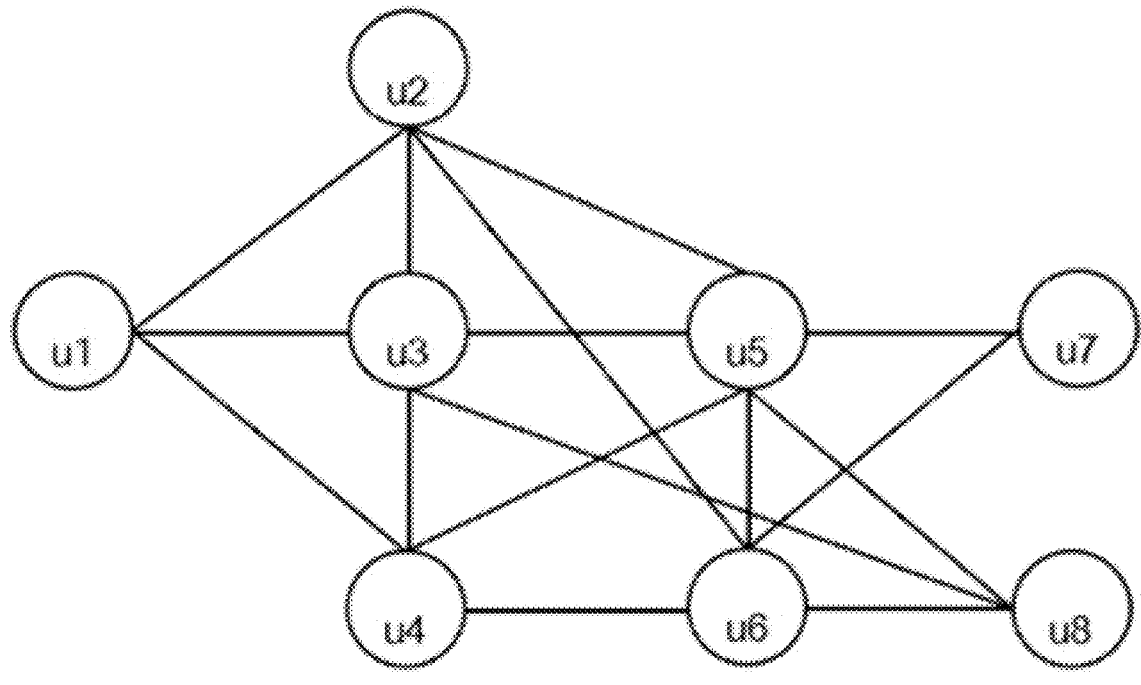
FIG. 3 is a schematic diagram of a social network graph according to another embodiment of the present application.
Figure 4A:
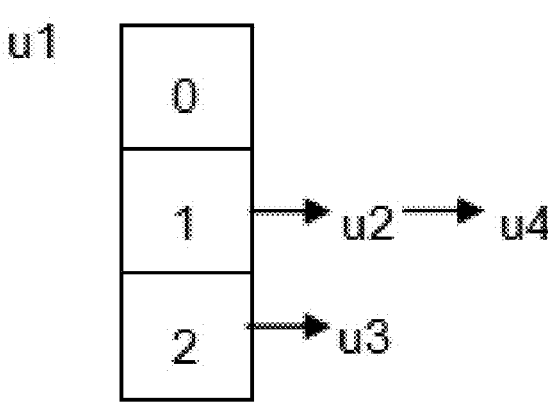
FIGS. 4A-4H are schematic diagrams of an indexed linked list data structure according to another embodiment of the present application.
Figure 4B:
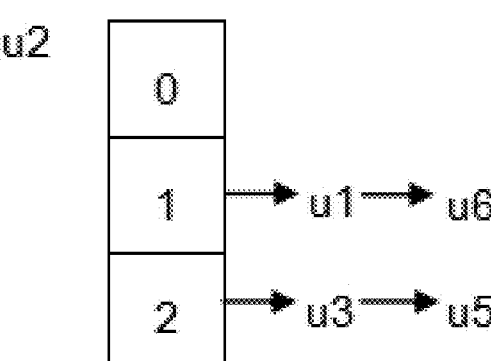
Figure 4C:
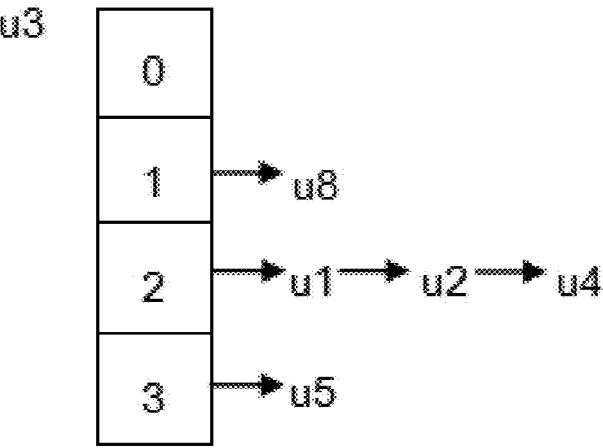
Figure 4D:
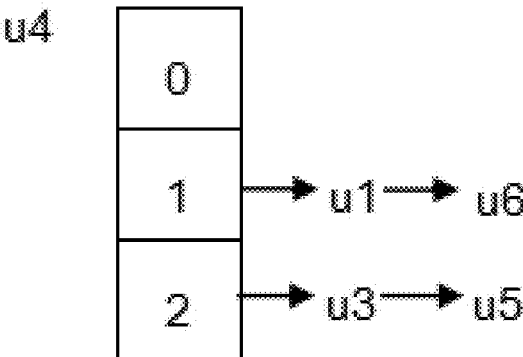
Figure 4E:
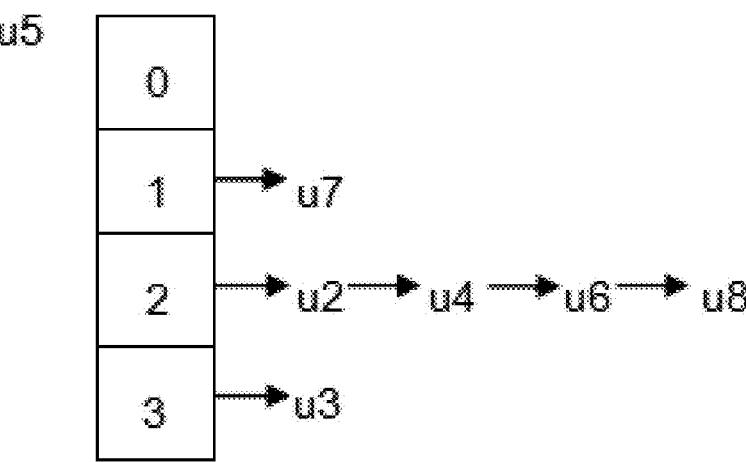
Figure 4F:
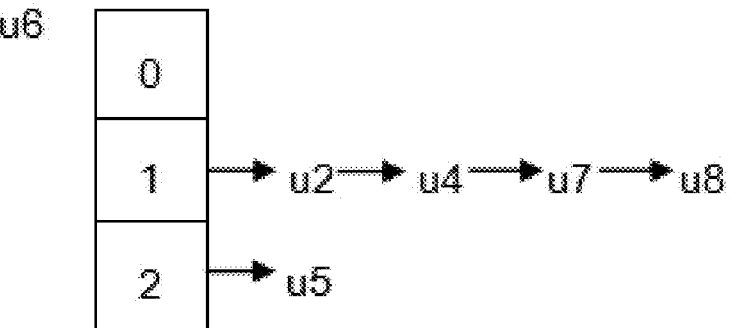
Figure 4G:
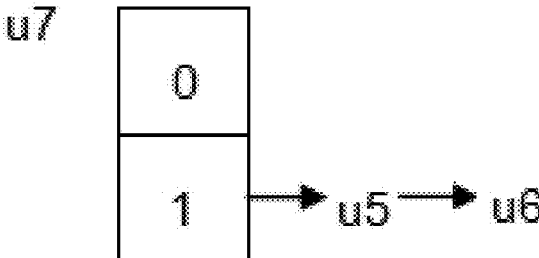
Figure 4H:
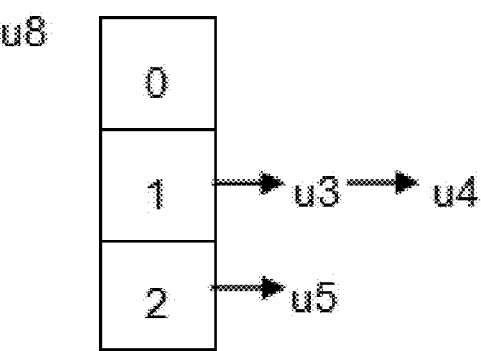

Step 1.1: Input a social network graph $G_1=(U_1, E_1)$, as shown in FIG. 3. A node set $U_1$={u1, u2, u3, u4, u5, u6, u7, u8} represents a set of users in a social network. The node ui represents a user i. $E_1$ represents edges connecting adjacent nodes. Each edge represents that two users are friends, and they are neighboring nodes.

Step 1.2: Define and initialize the single-hop connectivity.

Step 1.3: Calculate a quantity of CNs of the object node and its neighboring node.

Step 1.3.1: Taking the node u1 as an example, calculate intersections of a neighboring node set of the node u1 and neighboring node sets of its neighboring nodes. The intersections of the neighboring node set N(u1)={u2, u3, u4} of the node u1 and the neighboring node sets N(u2)={u1, u3, u5, u6}, N(u3)={u1, u2, u4, u5, u8}, and N(u4)={u1, u3, u5, u6} are N(u1) ∩N(u2)={u3}, N(u1)∩N(u3)={u2, u4}, and N(u1)∩N(u4)={u3}. An array sumu1 is used to record the quantity of CNs of the node u1 and each of its neighboring nodes, to obtain sumu1[u2]=1, sumu1[u3]=2, and sumu1 [u4]=1.

Step 1.4: Generate the indexed linked list data structure for one or more single-hop connectivities corresponding to the object node and the neighboring node corresponding to each single-hop connectivity.

Step 1.4.1: Establish and initialize an array CNul [maxCN+1]. Because the CN value of each neighboring node of the node u1 has been obtained in step 1.3, a length of the array is a maximum CN value (maxCN) plus 1. Based on the array sumu1[uk] obtained in step 1.3.1, maxCN of u1 is equal to 2. Therefore, an array CNu1 [3] is established and initialized.

Step 1.4.2: Establish a reachable node linked list based on the length of the array CNu1[3], and sequentially add the neighboring nodes of u1 to the linked list based on the values of the array sumu1[uk].

Step 1.4.2.1: With cnLink representing the reachable node linked list, initialize the reachable node linked list cnLink corresponding to CN=n, and initialize its head node pointer headNode.

Step 1.4.2.2: Sequentially add the nodes in sumu1[uk] at the end of the linked list cnLink based on their values. The following linked list cnLink is established based on sumu1 [u2]=1 and sumu1[u4]=1 obtained in step 1.3.1: u2→u4.

Step 1.4.2.3: Store the head node pointer headNode pointing to the linked list cnLink corresponding to the CN value at a corresponding position of an array CNu1[n], for example, CNu1[1]=headNode→u2→u4.

Step 1.4.3: Repeat steps 1.4.1 and 1.4.2 until the linked list cnLink is established and storage in the array CNu1[n] is completed for each CN value of the node u1, to form the indexed linked list data structure of the node u1.

Step 1.5: Repeat steps 1.2 to 1.4 until the indexed linked list data structure of each node in the node set $U_1$ is constructed. Finally obtained indexed linked list data structures are shown in FIGS. 4A-4H.

Step 2: Assuming that a start node is u1, a target node is u8, and a given path connectivity is 1, search neighboring nodes with a CN value greater than or equal to 1 to obtain a shortest influence path between u1 and u8. The given path connectivity in this step is variable in that it depends on a path connectivity in a current iteration input in a subsequent step when being called in the step. It is assumed to be 1 herein only to describe a specific operation process of this step.

Step 2.1: Create an initial set and state variables. A set $U_1'=\{u1\}$ containing only the start node is used as the initial set. It is a subset of the set $U_1$ containing all nodes. If a shortest path from u1 to a node v' is known, the node v' is included in U1'.

Step 2.1.1: With D(w) defined as a length of a shortest path from the start node u1 to a node w passing through the node V in $U_1'$ in a current phase, in an initial phase, because there is only the start node u1 in $U_1'$, set D(u2)=1, D(u3)=1, and D(u4)=1 for neighboring nodes of the start node u1, and assign an initial value of $\infty$ to the other nodes. With P(w) defined to store a predecessor node of the node w on the shortest path in the current phase, set P(u2)=u1, P(u3)=u1, and P(u4)=u1 for the neighboring nodes of u1. With CN_P(w) defined as a CN value of the node w and its P(w) in the current phase, set CN_P(u2)=1, CN_P(u3)=2, and CN_P(u4)=1 for the neighboring nodes of u1 based on the indexed linked list data structure shown in FIGS. 4A-4H.

Step 2.2: Add the node v' with a minimum value of D(w) in the current phase to the initial set. When $U_1'=\{u1\}$ in the initial phase, the node u2 with the minimum value of D(w) is found and added to the set $U_1'$.

Step 2.3: Traverse the indexed linked list data structure of u2 to obtain neighboring nodes {u1, u6, u3, u5} with CN values greater than or equal to the path connectivity, and update their three state variables: D(w), P(w), and CN_P(w).

Step 2.3.1: Update D(w) based on the following formula: D(w)=min(D(w), D(u2)+1) D(u6)=min($\infty$, 2)=2. D(u3)=min(1, 2)=1. D(u5)=min($\infty$, 2)=2.

Step 2.3.2: Because D(u6) and D(u5) change, set P(u6) and P(u5) to P(u6)=u2 and P(u5)=u2, and CN_P(u6) and CN_P(u5) to single-hop connectivities between u2 and u6 and u5, respectively, that is, CN_P(u6)=1 and CN_P(u5)=2. Because D(u3) does not change, the three state variables of the node u3 remain unchanged.

Step 2.4: Iterate steps 2.2 and 2.3 until all nodes in the set $U_1$ are in the set $U_1'$. A result obtained after the initial set and state variables are updated is shown in FIG. 5.

Step 2.5: As shown in FIGS. 4A-4H, with D(u8)=2 for the target node, continuously backtrack based on a predecessor node P(u8) of u8 to find the following shortest influence path from the start node u1 to the target node u8: ShortestPath=u1→u3→u8, traverse ShortestPath to obtain a single-hop connectivity between adjacent nodes on the path, and use the minimum value as the connectivity of the shortest path currently found.

Step 3: Initialize a minimum path connectivity minPathCN and a maximum path connectivity maxPathCN for the start node u1 and the target node u8.

Step 3.1: Set the minimum path connectivity minPathCN to 1.

Step 3.2: Set the path connectivity to twice the minimum value, reuse basic steps of a shortest path search process in step 2, narrow the search range of the indexed linked list data structure based on the path connectivity at this time, and find out whether there is a shortest path with a connectivity greater than or equal to the path connectivity at this time.

Step 3.2.1: Reuse the shortest path search process in step 2. Apparently, in step 2.3, the search range of neighboring nodes of the node v' at this time is all nodes with a CN value greater than or equal to the path connectivity. That is, only neighboring nodes with a CN value greater than or equal to twice the minimum path connectivity are searched.

Step 3.2.2: Obtain the following shortest path: ShortestPath=u1→u3→u5→u8, and assign a path connectivity of 2 to minPathCN as a new minimum path connectivity.

Step 3.3: Repeat step 3.2 to find that there is no path with a connectivity of 4, and set the maximum path connectivity to maxPathCN=4, which is a maximum path connectivity in the subsequent step.

Step 4: Narrow value ranges of minPathCN and maxPathCN through dichotomy until minPathCN=maxPathCN−1, to obtain a high-connectivity shortest influence path. A process of searching for the maximum path connectivity and the minimum path connectivity is shown in FIG. 6.

Step 4.1: Set PathCN to an intermediate value of the minimum value minPathCN and the maximum value maxPathCN and round down the intermediate value to the nearest integer, that is, PathCN=$\lfloor$(minPathCN+maxPathCN)/2$\rfloor$=$\lfloor$(2+4)/2$\rfloor$=3.

Step 4.2: Reuse the shortest path search process in step 2. PathCN is used as input of step 2.3. The search range of the neighboring nodes of the node V is limited to all nodes with a CN value greater than or equal to 3. That is, only neighboring nodes with a CN value greater than or equal to 3 are searched.

Step 4.3: Set maxPathCN to 3 because a path with a CN value greater than or equal to 3 cannot be found in step 4.2.

Step 4.4: When minPathCN=maxPathCN−1, obtain minPathCN=2 as a maximum connectivity from the start node u1 to the target node u8. Store the found shortest path ShortestPath=u1→u3→u5→u8 and its connectivity of 2, which is the high-connectivity shortest influence path.

Step 5: Return the obtained high-connectivity shortest influence path ShortestPath=u1→u3→u5→u8.

In FIG. 3, the high-connectivity shortest influence path between the nodes u1 and u8 is u1→u3→u5→u8, and its path connectivity is 2. A shortest path between the nodes u1 and u8 obtained through an existing shortest path calculation method is u1→u3→u8, and its path connectivity is 1. Because there is the path with a connectivity of 2, a probability that influence eventually reaches the target node increases during propagation of influence of u1 on u8. In actual marketing, if u1 represents an enterprise, and influence paths from u1 to two nodes have a same length, but one of the paths has a higher connectivity, marketing nodes on the path with the higher connectivity achieves a higher probability of success and a better propagation effect. Therefore, the present disclosure can be used to analyze a possibility of influence between two nodes, and help enterprises or governments more accurately select nodes in a social network for promotion.

The present application further provides an application scenario. The method for querying a high-connectivity shortest influence path between users is applied to the application scenario. Specifically, the method for querying a high-connectivity shortest influence path between users provided in this embodiment may be applied to an information propagation scenario. The information propagation scenario includes a path generation phase and a path application phase. In the path generation phase, an indexed linked list data structure is constructed based on an obtained social network graph, and iterations are continuously performed based on the indexed linked list data structure, a start node, and a target node to determine a high-connectivity shortest influence path. In the path application phase, information is propagated along the high-connectivity shortest influence path. The method for querying a high-connectivity shortest influence path between users provided in this embodiment belongs to the path generation phase and the path application phase.

Figure 7:
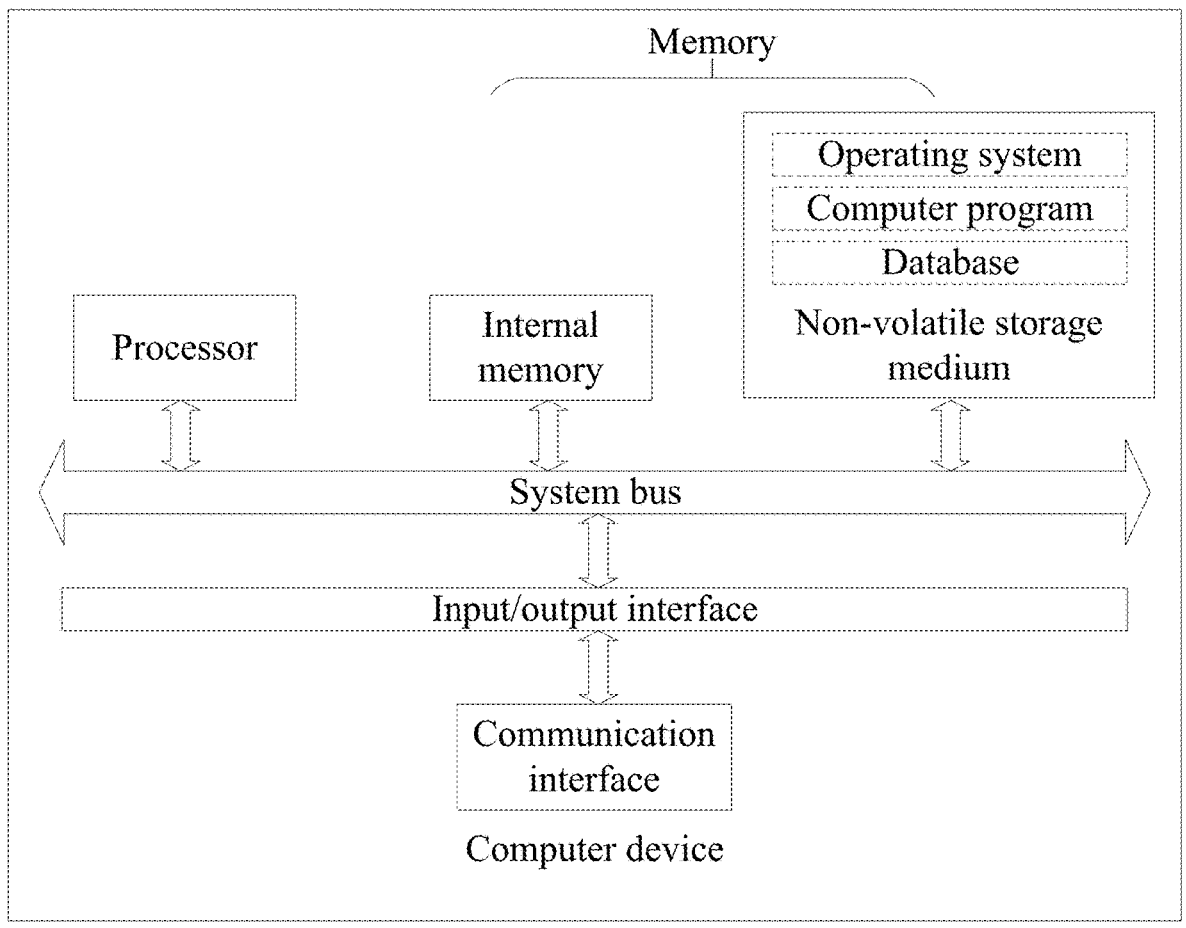
FIG. 7 is a schematic structural diagram of a computer device according to an embodiment of the present application.

In an exemplary embodiment, a computer device is provided. The computer device may be a server or a terminal. An internal structure thereof may be as shown in FIG. 7. The computer device includes a processor, a memory, an input/output (I/O) interface, and a communication interface. The processor, the memory, and the I/O interface are connected through a system bus. The communication interface is connected to the system bus through the I/O interface. The processor of the computer device is configured to provide computing and control capabilities. The memory of the computer device includes a non-volatile storage medium and an internal memory. The non-volatile storage medium stores an operating system, a computer program, and a database. The internal memory provides an environment for operation of the operating system and the computer program in the non-volatile storage medium. The database of the computer device is configured to store processing data. The I/O interface of the computer device is configured to exchange information between the processor and an external device. The communication interface of the computer device is configured to communicate with an external terminal over a network. The computer program, when executed by the processor, implements a method for querying a high-connectivity shortest influence path between users.

In an exemplary embodiment, a computer device is provided, including a memory and a processor. The memory stores a computer program. The processor, when executing the computer program, implements the steps in the foregoing method embodiments.

In an exemplary embodiment, a computer-readable storage medium is provided, storing a computer program. The computer program, when executed by a processor, implements the steps in the foregoing method embodiments.

In an exemplary embodiment, a computer program product is provided, including a computer program. The computer program, when executed by a processor, implements the steps in the foregoing method embodiments.

It should be noted that information about a user (including but not limited to device information of the user, personal information of the user, and the like) and data (including but not limited to data for analysis, stored data, displayed data, and the like) in the present application are information and data authorized by the user or fully authorized by each party, and relevant data shall be acquired, used, and processed according to relevant regulations.

Those of ordinary skill in the art may understand that all or some of the procedures in the method of the foregoing embodiments may be implemented by a computer program instructing related hardware. The computer program may be stored in a non-volatile computer-readable storage medium. When the computer program is executed, the procedures in the embodiments of the foregoing method may be performed. Any reference to a memory, a database, or other media used in the embodiments of the present application may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, or the like. The volatile memory may include a random access memory (RAM), an external cache memory, or the like. As an illustration rather than a limitation, the RAM may be in various forms, such as a static RAM (SRAM) or a dynamic RAM (DRAM).

The database in the embodiments of the present application may include at least one of a relational database and a non-relational database. The non-relational database may include a distributed database based on a blockchain, but is not limited thereto. The processor in the embodiments of the present application may be a general processor, a central processor, a graphics processor, a digital signal processor (DSP), a programmable logic device, or a data processing logic device based on quantum computing, but is not limited thereto.

The technical characteristics of the foregoing embodiments can be employed in arbitrary combinations. To provide a concise description of these embodiments, all possible combinations of all the technical characteristics of the foregoing embodiments may not be described; however, these combinations of the technical characteristics should be construed as falling within the scope defined by this specification as long as no contradiction occurs.

In this specification, some specific embodiments are used for illustration of the principles and implementations of the present application. The description of the foregoing embodiments is used to help illustrate the method of the present application and the core ideas thereof. In addition, those of ordinary skill in the art can make various modifications in terms of specific implementations and the scope of application in accordance with the ideas of the present application. In conclusion, the content of this specification shall not be construed as a limitation to the present application.

What is claimed is:

1. A method for querying a high-connectivity shortest influence path between users, implemented by a computer device comprising a memory, a processor, and a computer program stored in the memory and executable on the processor, wherein the method comprises:

receiving, by the processor, a social network graph, a start node and a target node;

constructing, by the processor, an indexed linked list data structure based the social network graph, wherein the social network graph comprises a plurality of nodes and edges connecting adjacent ones of the nodes, the nodes represent users in a social network, the edges represent mutual influence between adjacent ones of the users, and two nodes connected by each edge are neighboring nodes; the indexed linked list data structure is a linked list array data structure corresponding to each object node, and the linked list array data structure comprises the object node, one or more single-hop connectivities corresponding to the object node, and a neighboring node linked list corresponding to each single-hop connectivity; and the single-hop connectivity is a quantity of common neighboring nodes of adjacent nodes;

determining, by the processor, a path connectivity in a current iteration based on a minimum path connectivity in a previous iteration, and determining, by the processor based on a given path connectivity, the indexed linked list data structure, the start node, and the target node, whether there is a shortest influence path satisfying the given path connectivity, wherein the given path connectivity is the path connectivity in the current iteration; and if the current iteration is the first iteration, the minimum path connectivity in the previous iteration is set to 1;

if there is a shortest influence path satisfying the given path connectivity, calculating, by the processor, a shortest influence path in the current iteration and a path connectivity corresponding to the shortest influence path in the current iteration, updating the minimum path connectivity in the previous iteration to the path connectivity corresponding to the shortest influence path in the current iteration, and returning to the step of "determining a path connectivity in a current iteration based on a minimum path connectivity in a previous iteration, and determining, based on a given path connectivity, the indexed linked list data structure, a start node, and a target node, whether there is a shortest influence path satisfying the given path connectivity"; or if there is no shortest influence path satisfying the given path connectivity, updating, by the processor, a maximum path connectivity in the previous iteration to the path connectivity in the current iteration to obtain a search range of the path connectivity;

continuing, by the processor, the iteration based on the minimum path connectivity and the maximum path connectivity in the previous iteration until a high-connectivity shortest influence path is determined; and propagating information between the users along the high-connectivity shortest influence path.

2. The method for querying a high-connectivity shortest influence path between users according to claim 1, wherein continuing, by the processor, the iteration based on the minimum path connectivity and the maximum path connectivity in the previous iteration until the high-connectivity shortest influence path is determined comprises:

determining an intermediate path connectivity in the current iteration based on the minimum path connectivity and the maximum path connectivity in the previous iteration, updating the path connectivity in the current iteration to the intermediate path connectivity in the current iteration, and determining, based on the given path connectivity, the indexed linked list data structure, the start node, and the target node, whether there is a shortest influence path satisfying the given path connectivity, to obtain a first determining result;

if the first determining result is yes, calculating the shortest influence path in the current iteration and the path connectivity corresponding to the shortest influence path in the current iteration, and updating the minimum path connectivity in the previous iteration to the path connectivity corresponding to the shortest influence path in the current iteration; and determining whether a difference between the minimum path connectivity and the maximum path connectivity in the previous iteration is 1, to obtain a second determining result;

if the second determining result is yes, stopping the iteration, and determining the shortest influence path in the current iteration as the high-connectivity shortest influence path; or if the second determining result is no, returning to the step of "determining an intermediate path connectivity in the current iteration based on the minimum path connectivity and the maximum path connectivity in the previous iteration, updating the path connectivity in the current iteration to the intermediate path connectivity in the current iteration, and determining, based on the given path connectivity, the indexed linked list data structure, the start node, and the target node, whether there is a shortest influence path satisfying the given path connectivity, to obtain a first determining result";

if the first determining result is no, updating the maximum path connectivity in the previous iteration to the path connectivity in the current iteration, and determining whether the difference between the minimum path connectivity and the maximum path connectivity in the previous iteration is 1, to obtain a third determining result; and if the third determining result is yes, stopping the iteration, and determining a shortest influence path in the previous iteration as the high-connectivity shortest influence path; or if the third determining result is no, returning to the step of "determining an intermediate path connectivity in the current iteration based on the minimum path connectivity and the maximum path connectivity in the previous iteration, updating the path connectivity in the current iteration to the intermediate path connectivity in the current iteration, and determining, based on the given path connectivity, the indexed linked list data structure, the start node, and the target node, whether there is a shortest influence path satisfying the given path connectivity".

3. The method for querying a high-connectivity shortest influence path between users according to claim 2, wherein determining, by the processor based on the given path connectivity, the indexed linked list data structure, the start node, and the target node, whether there is the shortest influence path satisfying the given path connectivity comprises:

creating an initial set and state variables, wherein the initial set comprises the start node in an initial phase, and the state variables comprise a first state variable $D(w)$, a second state variable $P(w)$, and a third state variable $CN\_P(w)$; the first state variable $D(w)$ represents a length of a shortest path from the start node to a node w passing through a node v' in a current phase, the node v' is a node newly added to the initial set in the current phase, and the node w is a neighboring node of the node v' and is not added to the initial set in the current phase; the second state variable $P(w)$ represents a predecessor node, and the second state variable $P(w)$ is the node v'; and the third state variable $CN\_P(w)$ represents a single-hop connectivity between the node w and the second state variable $P(w)$;

adding the node v' with a minimum value of the first state variable $D(w)$ in the current phase to the initial set to obtain an updated initial set;

traversing an indexed linked list data structure of the node v', and determining whether a single-hop connectivity of the node v' is greater than or equal to the given path connectivity; and if the single-hop connectivity of the node v' is greater than or equal to the given path connectivity, obtaining a neighboring node of the node v' and with a single-hop connectivity greater than or equal to the given path connectivity, and updating the state variables; returning to the step of "adding the node v' with a minimum value of the first state variable $D(w)$ in the current phase to the initial set", until all nodes in the social network are in the initial set or the first state variable D(w) of any node that is not in the initial set is ∞; and determining whether the first state variable D(w) of the target node is ∞, and if the first state variable D(w) of the target node is ∞, determining that there is no shortest influence path corresponding to the given path connectivity, or if the first state variable D(w) of the target node is not ∞, determining that there is a shortest influence path corresponding to the given path connectivity; or if the single-hop connectivity of the node v' is less than the given path connectivity, determining that there is no shortest influence path corresponding to the given path connectivity.

4. The method for querying a high-connectivity shortest influence path between users according to claim 1, wherein in a process of determining the search range of the path connectivity, determining, by the processor, the path connectivity in the current iteration based on the minimum path connectivity in the previous iteration comprises:

determining twice the minimum path connectivity in the previous iteration as a maximum path connectivity in the current iteration.

5. The method for querying a high-connectivity shortest influence path between users according to claim 3, wherein the updating the state variables comprises:

updating the first state variable D(w) based on the following formula:

$$D(w)=\min(D(w),D(v')+1)$$

wherein D(v') represents a length of a shortest path in a previous phase, and if the first state variable D(w) changes, the second state variable P(w) is set to the node v', and the third state variable CN_P(w) is set to a single-hop connectivity between the node v' and the node w; or if the first state variable D(w) does not change, the second state variable P(w) and the third state variable CN_P(w) remain unchanged.

6. A computer device, comprising a memory, a processor, and a computer program stored in the memory and executable on the processor, wherein the processor executes the computer program to implement operations comprising:

receiving a social network graph, a start node and a target node;

constructing an indexed linked list data structure based on the social network graph, wherein the social network graph comprises a plurality of nodes and edges connecting adjacent ones of the nodes, the nodes represent users in a social network, the edges represent mutual influence between adjacent ones of the users, and two nodes connected by each edge are neighboring nodes; the indexed linked list data structure is a linked list array data structure corresponding to each object node, and the linked list array data structure comprises the object node, one or more single-hop connectivities corresponding to the object node, and a neighboring node linked list corresponding to each single-hop connectivity; and the single-hop connectivity is a quantity of common neighboring nodes of adjacent nodes;

determining a path connectivity in a current iteration based on a minimum path connectivity in a previous iteration, and determining, based on a given path connectivity, the indexed linked list data structure, the start node, and the target node, whether there is a shortest influence path satisfying the given path connectivity, wherein the given path connectivity is the path connectivity in the current iteration; and if the current iteration is the first iteration, the minimum path connectivity in the previous iteration is set to 1;

if there is a shortest influence path satisfying the given path connectivity, calculating a shortest influence path in the current iteration and a path connectivity corresponding to the shortest influence path in the current iteration, updating the minimum path connectivity in the previous iteration to the path connectivity corresponding to the shortest influence path in the current iteration, and returning to the step of "determining a path connectivity in a current iteration based on a minimum path connectivity in a previous iteration, and determining, based on a given path connectivity, the indexed linked list data structure, a start node, and a target node, whether there is a shortest influence path satisfying the given path connectivity"; or if there is no shortest influence path satisfying the given path connectivity, updating a maximum path connectivity in the previous iteration to the path connectivity in the current iteration to obtain a search range of the path connectivity;

continuing the iteration based on the minimum path connectivity and the maximum path connectivity in the previous iteration until a high-connectivity shortest influence path is determined; and propagating information between the users along the high-connectivity shortest influence path.

7. The computer device according to claim 6, wherein the continuing the iteration based on the minimum path connectivity and the maximum path connectivity in the previous iteration until a high-connectivity shortest influence path is determined comprises:

determining an intermediate path connectivity in the current iteration based on the minimum path connectivity and the maximum path connectivity in the previous iteration, updating the path connectivity in the current iteration to the intermediate path connectivity in the current iteration, and determining, based on the given path connectivity, the indexed linked list data structure, the start node, and the target node, whether there is a shortest influence path satisfying the given path connectivity, to obtain a first determining result;

if the first determining result is yes, calculating the shortest influence path in the current iteration and the path connectivity corresponding to the shortest influence path in the current iteration, and updating the minimum path connectivity in the previous iteration to the path connectivity corresponding to the shortest influence path in the current iteration; and determining whether a difference between the minimum path connectivity and the maximum path connectivity in the previous iteration is 1, to obtain a second determining result;

if the second determining result is yes, stopping the iteration, and determining the shortest influence path in the current iteration as the high-connectivity shortest influence path; or if the second determining result is no, returning to the step of "determining an intermediate path connectivity in the current iteration based on the minimum path connectivity and the maximum path connectivity in the previous iteration, updating the path connectivity in the current iteration to the intermediate path connectivity in the current iteration, and determining, based on the given path connectivity, the indexed linked list data structure, the start node, and the target node, whether there is a shortest influence path satisfying the given path connectivity, to obtain a first determining result";

if the first determining result is no, updating the maximum path connectivity in the previous iteration to the path connectivity in the current iteration, and determining whether the difference between the minimum path connectivity and the maximum path connectivity in the previous iteration is 1, to obtain a third determining result; and if the third determining result is yes, stopping the iteration, and determining a shortest influence path in the previous iteration as the high-connectivity shortest influence path; or if the third determining result is no, returning to the step of "determining an intermediate path connectivity in the current iteration based on the minimum path connectivity and the maximum path connectivity in the previous iteration, updating the path connectivity in the current iteration to the intermediate path connectivity in the current iteration, and determining, based on the given path connectivity, the indexed linked list data structure, the start node, and the target node, whether there is a shortest influence path satisfying the given path connectivity".

8. The computer device according to claim 7, wherein the determining, based on a given path connectivity, the indexed linked list data structure, a start node, and a target node, whether there is a shortest influence path satisfying the given path connectivity comprises:

creating an initial set and state variables, wherein the initial set comprises the start node in an initial phase, and the state variables comprise a first state variable D(w), a second state variable P(w), and a third state variable CN_P(w); the first state variable D(w) represents a length of a shortest path from the start node to a node w passing through a node v' in a current phase, the node v' is a node newly added to the initial set in the current phase, and the node w is a neighboring node of the node v' and is not added to the initial set in the current phase; the second state variable P(w) represents a predecessor node, and the second state variable P(w) is the node v'; and the third state variable CN_P(w) represents a single-hop connectivity between the node w and the second state variable P(w);

adding the node v' with a minimum value of the first state variable D(w) in the current phase to the initial set to obtain an updated initial set;

traversing an indexed linked list data structure of the node v', and determining whether a single-hop connectivity of the node v' is greater than or equal to the given path connectivity; and if the single-hop connectivity of the node v' is greater than or equal to the given path connectivity, obtaining a neighboring node of the node v' and with a single-hop connectivity greater than or equal to the given path connectivity, and updating the state variables; returning to the step of "adding the node v' with a minimum value of the first state variable D(w) in the current phase to the initial set", until all nodes in the social network are in the initial set or the first state variable D(w) of any node that is not in the initial set is ∞; and determining whether the first state variable D(w) of the target node is ∞, and if the first state variable D(w) of the target node is ∞, determining that there is no shortest influence path corresponding to the given path connectivity, or if the first state variable D(w) of the target node is not ∞, determining that there is a shortest influence path corresponding to the given path connectivity; or if the single-hop connectivity of the node v' is less than the given path connectivity, determining that there is no shortest influence path corresponding to the given path connectivity.

9. The computer device according to claim 6, wherein in a process of determining the search range of the path connectivity, the determining a path connectivity in a current iteration based on a minimum path connectivity in a previous iteration comprises:

determining twice the minimum path connectivity in the previous iteration as a maximum path connectivity in the current iteration.

10. The computer device according to claim 9, wherein the updating the state variables comprises:

updating the first state variable D(w) based on the following formula:

$$D(w)=\min(D(w),D(v')+1)$$

wherein D(v') represents a length of a shortest path in a previous phase, and if the first state variable D(w) changes, the second state variable P(w) is set to the node v', and the third state variable CN_P(w) is set to a single-hop connectivity between the node v' and the node w; or if the first state variable D(w) does not change, the second state variable P(w) and the third state variable CN_P(w) remain unchanged.

* * * * *